J. H. QUAIL.
Car Truck.
No. 3,457.
Patented Feb. 28, 1844.
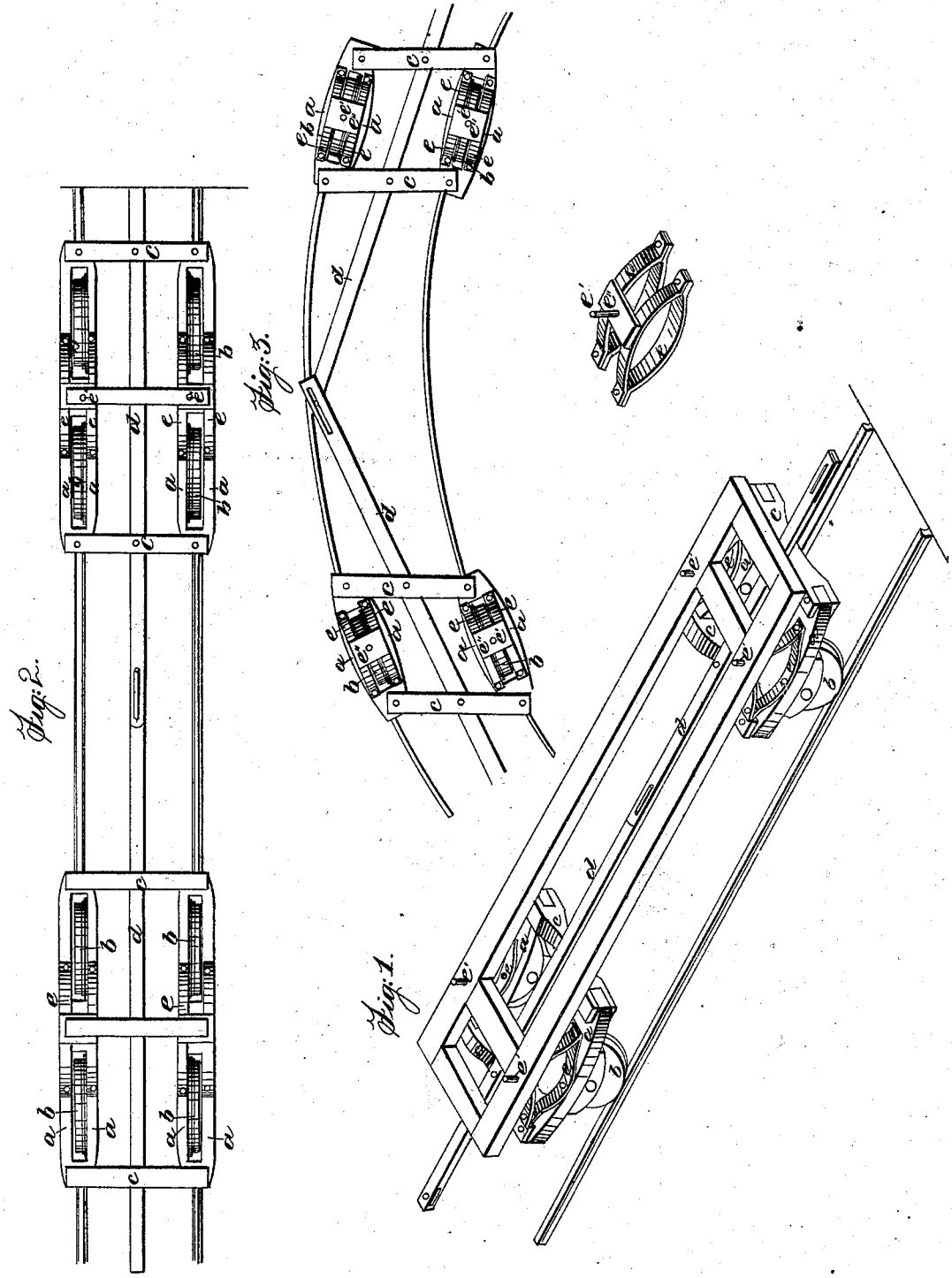

UNITED STATES PATENT OFFICE.

JNO. H. QUAIL, OF PHILADELPHIA, PENNSYLVANIA.

RAILROAD-CAR FOR TURNING CURVES.

Specification of Letters Patent No. 3,457, dated February 28, 1844.

*To all whom it may concern:*

Be it known that I, JOHN H. QUAIL, of Philadelphia, in the county of Philadelphia and State of Pennsylvania, have invented a new and useful Improvement in Railroad-Cars for Turning Curves; and I do hereby declare that the following is a full, clear, and exact description thereof, reference being had to the accompanying drawings, which form a part of this specification, in which Figure 1 is an isometrical view, Fig. 2 a plan, Fig. 3 truck turning a curve.

The nature of my invention consists in forming jointed trucks so that each wheel shall independently conform to the curve of the track and the car bodies shall receive their support on each side over the middle of the truck.

The truck is formed in the following way: Each side is composed of two pieces ($a$) firmly connected at each end, a brace being interposed to keep them sufficiently far apart to admit the wheel ($b$) between them; boxes are fastened to the under side of each of these pieces ($a$) which form the bearings of the axle of the wheel, this axle being only long enough to project sufficiently on each side for that purpose. Instead of one wheel two can be put, one before the other, in between said side pieces. These side pieces, thus formed, are connected to those on the opposite side of the cars, by cross pieces ($c$). The connecting joints at the four corners are made with loose mortises and tenons and have a single pin pass through them to allow the truck frame to assume a lozenge form in turning curves (see Fig. 3).

A draft or guiding bar ($d$) is attached to each of the cross pieces ($c$) by a single bolt passing down through the bar ($d$) and the center of each cross piece ($c$). This bar ($d$) extends out a sufficient distance before and behind and connects by an extension joint with the bar of the succeeding truck, which is formed in precisely the same way as that just described; and the cars are connected by the projecting ends of the same bars, a bolt passing through both at their junction. To unite the body of the car with these trucks, a common elliptic spring ($e$) is fastened to each of the pieces ($a$), forming the side pieces of the truck-frame; (two springs being placed on each side); these springs are united over the wheels by a bar ($e''$), which reaches from one to the other, and on which is a pin ($e'$), that projects up into the frame of the car directly over the point of contact between the wheel and rail, and keeps the wheels at a uniform distance apart, while they have freedom to turn to the right or left, when they encounter a curve; the turning of each succeeding truck being regulated by the direction taken by the first, by means of the guide bars ($d$) which connect the whole train.

By the above described construction the shortest curves can be encountered without difficulty or danger, and, as the axles do not extend across from side to side, uniting the wheels, there will be no slipping on the rail, with its attendant wear, and loss of power.

I am aware that the trucks of railroad cars have been so arranged that the axles of the wheels could be thrown in the direction of the radii of a curve by the draft or guide bar, the wheels on opposite sides being either attached to the same, or on separate axles; therefore I do not claim as my invention this general principle; but What I do claim as my invention and desire to secure by Letters Patent is—

The method of effecting this object by connecting the two sides ($a$, $a$,) in which the wheels work by means of the cross pieces ($c$, $c$,) jointed to them and to the draft or guide bar, as herein described.

JOHN H. QUAIL.

Witnesses:
J. J. GREENOUGH,
LAFAYETTE CALDWELL.